US012592961B2

(12) United States Patent
Alluru et al.

(10) Patent No.: US 12,592,961 B2
(45) Date of Patent: Mar. 31, 2026

(54) QUANTUM-BASED ADAPTIVE DEEP LEARNING FRAMEWORK FOR SECURING NETWORK FILES

(71) Applicant: Bank of America Corporation, Charlotte, NC (US)

(72) Inventors: Usha Rani Alluru, Hyderabad Telangana (IN); Saurabh Gupta, Dwarka Delhi (IN); Swathi Bussa, Hyderabad Telangana (IN); Shailendra Singh, Thane West Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 195 days.

(21) Appl. No.: 18/663,351

(22) Filed: May 14, 2024

(65) Prior Publication Data

US 2025/0358311 A1 Nov. 20, 2025

(51) Int. Cl.
| | |
|---|---|
| *H04L 9/40* | (2022.01) |
| *G06N 10/20* | (2022.01) |
| *G06N 10/60* | (2022.01) |

(52) U.S. Cl.
CPC ........... *H04L 63/145* (2013.01); *G06N 10/20* (2022.01); *G06N 10/60* (2022.01); *H04L 63/1416* (2013.01)

(58) Field of Classification Search
CPC ... H04L 63/145; H04L 63/1416; G06N 10/20; G06N 10/60
USPC .......................................................... 726/23
See application file for complete search history.

(56) References Cited

U.S. PATENT DOCUMENTS

| | | | |
|---|---|---|---|
| 2020/0342106 A1* | 10/2020 | Chelarescu | ......... G06F 11/1662 |
| 2025/0209176 A1* | 6/2025 | Palanki | ................. G06F 21/577 |
| 2025/0209462 A1* | 6/2025 | Cattan | .................... G06N 20/10 |

* cited by examiner

*Primary Examiner* — Michael R Vaughan
*Assistant Examiner* — Saad Ahmad Abdullah
(74) *Attorney, Agent, or Firm* — Weiss & Arons LLP

(57) ABSTRACT

Apparatus and methods for quantum-computing based file remediation are provided. A quantum file remediation program on a computer system with a standard processor and an "N"-qubit processor may receive a network file. When a file attribute score determined on the standard processor deviates by more than a predetermined amount from a baseline score, the program may initialize a quantum circuit. A deep learning framework using a quantum generative adversarial network (QGAN) may run on the quantum circuit and generate a remediated file. When the QGAN session ends, the quantum circuit may be collapsed and the original network file may be replaced by the remediated file.

21 Claims, 9 Drawing Sheets

QUANTUM-BASED ADAPTIVE DEEP LEARNING FRAMEWORK FOR SECURING NETWORK FILES

FIELD OF TECHNOLOGY

Aspects of the disclosure relate to providing apparatus and methods for utilizing quantum computing to remediate a security threat in a network file.

BACKGROUND OF THE DISCLOSURE

As more of the economy moves to computers and networks, detection and remediation of file vulnerabilities becomes increasingly important. Entities and individuals appear to be under constant attack from malicious actors. Malicious actors may launch breach attempts over networks such as the Internet.

By utilizing superposition and entanglement, quantum computers may exponentially advance system security over standard computers.

Quantum computers may use qubits for processing instead of or in addition to standard microprocessors. Qubits may rely on quantum principles such as entanglement and superposition to perform calculations. Results obtained from measuring qubits may include probabilities or a probability curve. Quantum processors may include quantum circuits. Quantum circuits may include qubits formed into various quantum gates.

Quantum computers using qubits may be able to detect vulnerable or infected files and remediate the security threat in a novel fashion compared to traditional computers.

Therefore, it would be desirable to provide apparatus and methods for leveraging quantum computing apparatus to improve network security.

SUMMARY OF THE DISCLOSURE

It is an object of this disclosure to provide apparatus and methods for a quantum-based adaptive deep learning framework for file remediation.

A quantum file remediation computer program product is provided. The computer program product may include executable instructions. The executable instructions may be executed by a computer system that includes a standard microprocessor and an "N"-qubit processor. "N" may be any number between two and one thousand.

The instructions may receive an original network file. The instructions may determine, on the standard processor, when a file attribute score associated with the file deviates by more than a predetermined amount from a first baseline score.

When a file attribute score associated with the file does not deviate by more than a predetermined amount from the first baseline score, the instructions may initially classify the file as cleared. When a file attribute score associated with the file deviates by more than a predetermined amount from the first baseline score, the instructions may initially classify the file as a security threat.

The instructions may also initialize a quantum circuit with the "N"-qubit processor. The instructions may operate a quantum generative adversarial network (QGAN) to synthesize and refine a replacement file using a deep learning framework.

When the QGAN session ends, the instructions may collapse the quantum circuit and store the replacement file in place of the original network file. The deep learning framework may utilize superposition and entanglement properties of the "N"-qubit processor.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
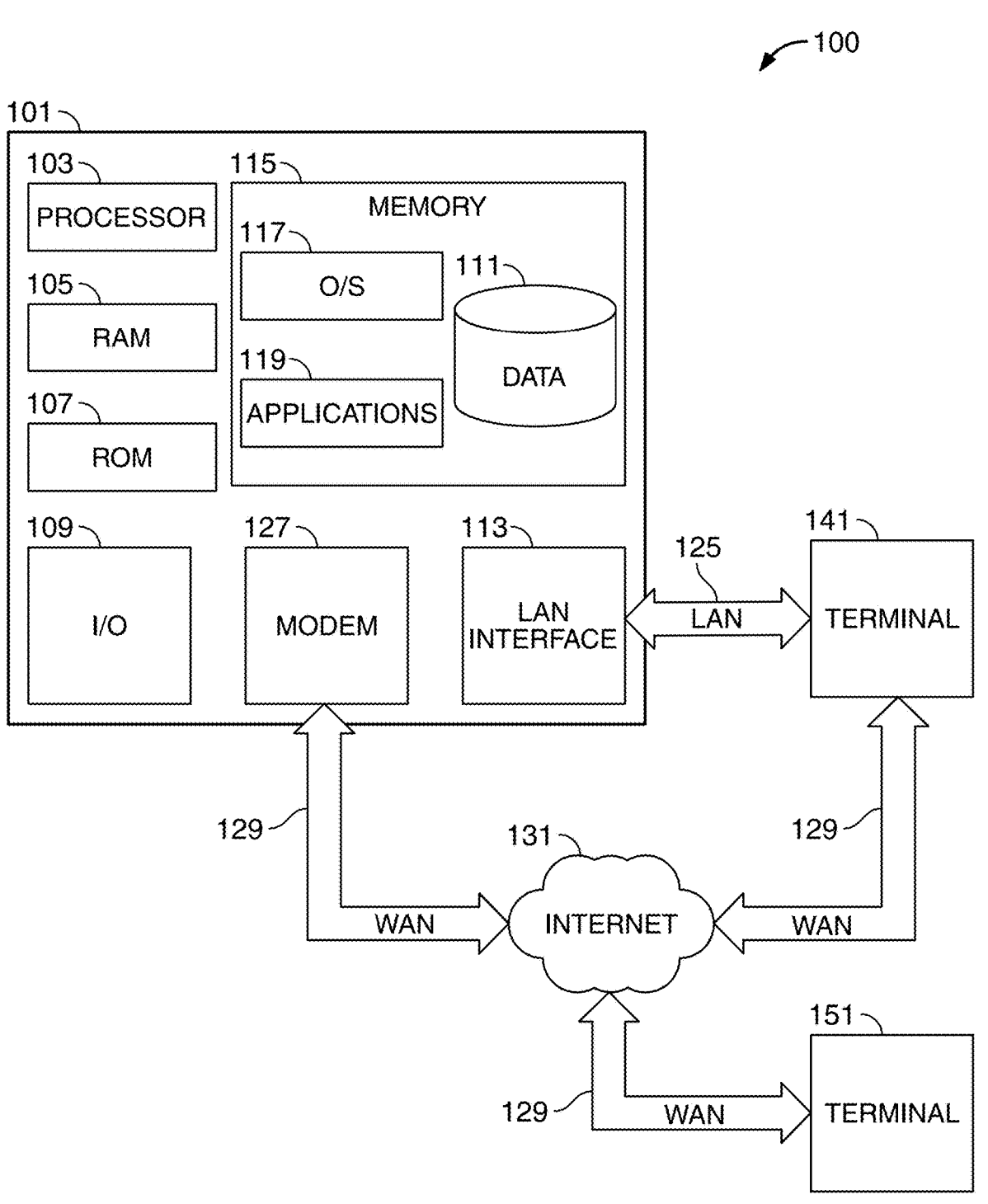
FIG. 1 shows an illustrative apparatus in accordance with principles of the disclosure.

It is an object of this disclosure to provide apparatus and methods for a quantum-based adaptive deep learning framework for file remediation.

Files moving over a network may be subject to corruption or malicious attacks. In addition to bad actors, files may be vulnerable due to improper firewalls or access control settings, failure to activate a patching mechanism, or failure in monitoring, among other reasons. Elements of a file may become vulnerable or may become infected with malware.

A quantum file remediation computer program product is provided. The computer program product may include executable instructions. The executable instructions may be executed by a computer system that includes a standard microprocessor and an "N"-qubit processor. "N" may be any number between two and one thousand. A standard microprocessor or standard processor may include all non-quantum computer processors.

References to the "the instructions" may refer to the computer program product.

Quantum computing may be referred to as the use of quantum-mechanical phenomena such as superposition and entanglement to perform computations. The smallest bit in a quantum computer may be called a qubit.

The number and type of calculations that a quantum computer may be able to process may grow exponentially with the number of qubits included in the quantum computer's processing core. A quantum computer with "N" qubits may be able to simultaneously represents $2^n$ states. Therefore, two qubits may hold four states, three qubits may hold eight states, fifty qubits may hold 1, 125, 899, 906, 842, 624 states, and 10,000 qubits may hold 210000 states.

Quantum processors are associated with vastly improved efficiencies over classical computers. For example, whereas classical computers represent data in bits, which can be either 0 or 1, quantum processors use qubits which utilize superposition (i.e., the ability to be in multiple states at the same time until it measured) to allow for a state of 0, 1, or any probability of being 0 or 1.

The probabilities may be manipulated using matrix-based quantum gates, which are analogous to classical logic gates. Qubits are therefore able to represent many more data possibilities than a bit-based system of the same size. This allows for greater speed and less memory usage than classical systems.

A qubit in a state of superposition does not have a defined value because it may hold many potential values at the same time. When measured, the qubit wave function collapses to a defined state. When an entangled qubit is in a state of superposition, each of its entangled connections is also in a state of superposition. These combinations of uncertainties may exponentially increase the power of quantum computers.

The quantum processor may include a number of quantum threads. Each quantum thread may include a default number of quantum circuits. Quantum circuits, in turn, may refer to hardware and software based computational models that include quantum gates and are used for executing quantum computations.

For example, in some embodiments, at least one of the quantum circuits may include a Toffoli gate. A feature of the Toffoli gate is its universal nature, i.e., it is able to represent classical computer operations as well as quantum operations.

In some embodiments, at least one of the quantum circuits may include a Hadamard gate. A feature of the Hadamard gate is the ability to represent a superposition state.

Other standard components of a computer system may be present, such as communication links, displays, input and output devices, read-only and random-access memory, and other components.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The non-transitory memory may be configured to store executable data configured to run on the "N"-qubit processor and/or the standard processor.

The "N"-qubit processor and/or standard processors may control the operation of the computer system and its components, which may include RAM, ROM, an input/output module, and other memory. Other components commonly used for computers, such as EEPROM or Flash memory or any other suitable components, may also be part of the apparatus and computer system.

A communication link may enable communication with other computers and servers, as well as enable the program to communicate with databases. The communication link may include any necessary hardware (e.g., antennae) and software to control the link. Any appropriate communication link may be used, such as Wi-Fi, bluetooth, LAN, and cellular links. Multiple communication links may be present. In an embodiment, the network used to communicate may be the Internet. In another embodiment, the network may be an internal intranet or other internal network.

The computer program product may be a wrapper engine. The wrapper engine may receive files from different parts of a network. The wrapper engine may sit outside the network.

The wrapper engine may be isolated from other system architecture in order to avoid potential contamination from infected files.

The computer program product may receive a file. The file may be encrypted. Any suitable encryption method may be used. The file may be hashed. Any suitable hashing algorithm may be used.

In some embodiments, the selection of files for input to the computer programming product may be variable. In some embodiments, the parameters or schedule for selection may be varied by a system administrator. A system administrator or other user may vary the parameters or schedule either before or during processing. For example, it may be determined that a particular file requires a more thorough analysis than another particular file.

In some embodiments, the instructions may be applied to files after a data transfer. The instructions may be applied at each network node after a file is received. In some embodiments, the instructions may be applied on a random or periodic schedule. In some embodiments, the schedule or selection of files may be determined based on the sensitivity of the data, file access parameters, the type of file, or any suitable parameters.

In some embodiments, the parameters or schedule for file selection may be automatically varied by one or more AI/ML algorithms. An algorithm may vary the parameters or schedule either before or during processing.

The instructions may determine, on the standard processor, a file attribute score. The file attribute score may be based on file attribute statistics. File statistics may include file size. For example, encryption mechanisms may increase file weight, so a larger file may be less vulnerable. On the other hand, a change in file size following a transfer may indicate that foreign material such as malware was appended to the file. In some cases, a change in file size following a transfer may be caused by routine network repackaging for TCP protocols and may be benign.

File attribute statistics may be based on file entropy. File entropy may correspond to the degree of structure in the file. For example, a file containing exe code may have a more structured byte distribution. Higher entropy levels may correspond to a less structured file which may be more vulnerable to security threats.

File attribute statistics may include file metadata. Metadata may include author information, date of creation, version data, programming language, and any suitable metadata. Changes to file metadata may indicate an infected file.

File attribute statistics may include multi-attribute patterns. Examples of multi-attribute patterns may include renaming files or extensions, file iterations, file transmissions, changes in file count, or any suitable patterns. Deviations from historical baseline patterns may indicate an infected file. In some embodiments, historical baselines may be established for a particular file or type of file.

The instructions may use one or more artificial intelligence/machine learning ("AI/ML") algorithms to determine a file attribute score. The instructions may use one or more AI/ML algorithms to determine when the file attribute score deviates by a predetermined amount from a threshold score stored in the database. Any suitable AI/ML algorithm may be used. Machine learning models may include regression, classification, cluster analysis, or any suitable machine learning algorithms. In some embodiments, a machine learning model may incorporate multiple machine learning algorithms. The multiple algorithms may be applied selectively or may be applied in sequence.

The file attribute statistics may be input to AI/ML models. The AI/ML models may output a file attribute score. In some embodiments, a component score may be determined for each file statistic. The file attribute score may be an aggregate score. The file attribute score may be a composite score. Each component of the file attribute score may be weighted. The weights may be adjusted based on user input. User input may be received at a GUI or via any suitable method. The weights may be adjusted by the AI/ML model.

The instructions may compare the file attribute score to a threshold file attribute score. The threshold file attribute score may be a baseline score. The threshold file attribute score may be determined based on historical data. The historical data may include infected files or files with a detected security threat. The historical data may be stored in a database. The historical data may be used to train AI/ML learning models.

A threshold file attribute score may be stored in the database. In some embodiments, multiple thresholds may be stored in the database. Different thresholds may be adaptively calculated for different classes of files. For example, a particular threshold may be applied based on the sensitivity of the file data. A particular threshold may be applied based on file history, including past movement of the file within the network or outside the network. A particular threshold may be selected based on user input. User input may be received at a graphical user interface or via any suitable method. A particular threshold may be selected based on a determination by an AI/ML algorithm.

The instructions may determine, on the standard processor, when a file attribute score deviates by more than predetermined amount from a threshold file attribute score. When the file attribute score does not deviate by more than a predetermined amount from a threshold file attribute score, the instructions may initially classify the file as cleared. The cleared file may be maintained in its routine storage location on the network. In some embodiments, the instructions may store files that have been classified as cleared in a separate location.

The instructions may determine, on the standard processor, when a file attribute score deviates by more than a predetermined amount from a threshold file attribute score. When the file attribute score deviates from the threshold file attribute score by more than the predetermined amount, the instructions may initially classify the file as a security threat.

In some embodiments, the file attribute score may be expressed as a file attribute vector. The file attribute vector may express the relationship between the file attributes in three-dimensional space. The instructions may determine when the file attribute vector deviates from a baseline vector by more than a predetermined distance in vector space.

The instructions may initialize a quantum circuit with the "N"-qubit processor. A quantum circuit may include qubits and quantum gates and may be configured to receive data and produce an output. A group of qubits may be referred to as a quantum register. The quantum gates may perform operations that manipulate quantum state(s) of the qubits. These operations may be part of the file remediation algorithm described below.

When the file attribute score deviates by more than a predetermined amount from a threshold file attribute score, the instructions may initialize the quantum circuit with the "N"-qubit processor. In some embodiments, the quantum circuit may be initiated for all files. In some embodiments, the quantum circuit may be initiated based on a combination of the amount of the deviation from the threshold and the sensitivity of the file data or based on any other suitable parameters. In some embodiments, the parameters or schedule for quantum processing of a file may be varied by a system administrator. A system administrator or other user may vary the parameters or schedule in response to classification of a file. For example, it may be determined that a particular file requires a higher level of review.

In some embodiments, the parameters or schedule for quantum processing of a file may be automatically varied by one or more AI/ML algorithms. An algorithm may vary the parameters or schedule in response to classification of a file.

A cloud-based encoder may encrypt the file for transmission to a quantum processor. In some embodiments, a copy of the encrypted file may be stored in a cache repository. In some embodiments, a file attribute profile associated with the encrypted file may be stored in the cache repository. A file and/or file attribute profile may be compared to stored files from the cache repository.

If the file is identical to a file stored in the cache repository or has a percentage match within a predetermined threshold, the processing output for the file stored in the cache repository may be applied, eliminating the need for additional processing.

The instructions may operate a deep learning framework on the quantum circuit. The deep learning framework may include one or more neural networks. The deep learning framework may include a generative adversarial network (GAN).

The quantum GAN (QGAN) may refine a remediated version of the file through multiple adversarial learning cycles. The QGAN may use properties of a quantum circuit and qubits, such as superposition and entanglement, to remediate security threats in the file. The remediation may include detecting malware, corrupt code, vulnerable code, and/or other security threats. The remediation may include generating a synthetic file that includes the content and features of the original file but removes the security threat. The remediation may include generating updated versions of the synthetic file through multiple iterative learning cycles to ensure it is authentic, functional, and free of security threats.

The QGAN may include a generator network. The generator network may be a neural network. The generator network may learn to generate new data with the same statistics as a training set. For example, a generator network trained on photographs may generate new photographs that appear authentic. The QGAN generator network may generate a replacement file that includes features and content of the original file. The generator network may remediate a security threat in the replacement file.

The QGAN may include a discriminator network. The discriminator network may be a neural network. Output from the generator network may be refined through indirect training using the discriminator network. The discriminator network may process input from the generator network based on training data.

The discriminator network may determine the authenticity of the replacement file. The discriminator network may determine the security level of the replacement file. The discriminator network may be trained using historical file data. The discriminator network may be trained using historical security threat data. The discriminator network may be trained using data from manufacturers and industry experts regarding new security threats and vulnerabilities. The quantum capabilities of the QGAN may enable the discriminator network to consider a vast range of data with regard to the replacement file. The discriminator network may be updated dynamically.

The discriminator network may determine that the replacement file is not an acceptable version of the file. In response to the determination by the discriminator network, the generator network may generate an updated version of the replacement file. The updated version may include improvements that address security threats identified by the discriminator network. For example, a particular version of a programming language may include logs that have previously been attacked. The updated version of the file may use logs from a different version of the programming language libraries.

The discriminator network and the generator network may operate through multiple iterative cycles. The activity of the discriminator network may function as indirect training for the generator network. Outputs from the two networks may converge to minimize a QGAN gradient. The variance between the outputs may reach an acceptable level at a point of equilibrium. The QGAN may reach a point of Nash equilibrium. Game theory teaches that at Nash equilibrium further amendment will not improve the outcome for either network.

The discriminator network may generate a quantum file attribute score in the course of evaluating the file. The discriminator network may compare the file attribute score to a threshold score. The threshold score may be dynamically autogenerated based on the unique file characteristics and the range of training data. The discriminator network may autogenerate a new threshold and/or a new quantum file attribute score for each version of the replacement file.

A file attribute score at the standard computer may be determined based on a standardized list of file features such as file size. This screening may filter out files that may potentially have a security threat. In contrast, a quantum file attribute score determined by the QGAN may include vastly more training data and may adaptively target specific security threats that are detected in particular file content.

When the QGAN session ends, the instructions may collapse the quantum circuit. The QGAN session may terminate when the discriminator network accepts the replacement file created by the generator network. The QGAN may reach a state of equilibrium. The QGAN session may reach a state of equilibrium when the output of the generator network meets a threshold file attribute score output by the discriminator network. Collapsing the quantum circuit may terminate operation of the QGAN.

The deep learning framework may utilize a superposition property of the "N"-qubit processor. As superposition may include infinite probabilities of a qubit being between 0 and 1, or 0 and 1, these probabilities may allow for complex analysis of file attributes and patterns and autogeneration of file attribute scores as well as dynamic thresholds based on real time training data.

The deep learning framework may utilize one or more entanglement algorithms. Entanglement algorithms may take advantage of the quantum phenomenon of two or more qubits being entangled, so that an action on one qubit may appear on another entangled qubit.

In some embodiments, the quantum circuit may include one or more Toffoli or Hadamard gates. Other quantum logic gates may be used as well.

In some embodiments, a notification may be transmitted to a user in response to activity at the standard processor. In some embodiments, a notification may be transmitted to a user in response to operation of the QGAN at the quantum processor. The notification may be a sound, picture, text, graphical display, or any suitable form of notification. The notification may be displayed on a graphical user interface.

The graphical user interface may be a computer display, smartphone display, or any suitable display.

The notification may include file attribute scores, specific detected security threats, reports related to infected files or files with detected security threats, a log of files processed, alerts regarding individual files, groups of files or classes of files, or any suitable notifications.

The computer program product may update training data stored in the database. The training data may be updated to include security threats detected by the deep learning framework. The training data may be used to train the AI/ML algorithms on the standard network.

When the QGAN session is complete, the instructions may transmit the replacement file output by the QGAN to a cloud-based decoder. The cloud-based decoder may decrypt the replacement file. The computer program product may delete the original file from network storage and store the replacement file in its place. In some embodiments, the network may store the original file in a separate location.

An apparatus for quantum authentication using quantum computing is provided. The apparatus may include a computer system.

The computer system may include a communication link, a microprocessor, an "N"-qubit processor, and a non-transitory memory.

The non-transitory memory may be configured to store at least an operating system and a quantum file remediation application.

The quantum file remediation application may be configured to receive a network file. The network file may have a set of attributes.

The application may determine, on the microprocessor, when a file attribute score exceeds a predetermined distance from a first baseline score. The file attribute score may be based on the set of attributes and determined using AI/ML algorithms.

When the file attribute score exceeds a predetermined distance from the first baseline score, the application may initialize a quantum circuit with the "N"-qubit processor and operate a QGAN framework on the quantum circuit to output a replacement file with a remediated security threat.

When the QGAN session ends, the application may collapse the quantum circuit and replace the network file with the replacement file.

"N" may be a number between two and one thousand, and the QGAN framework may utilize a superposition property of the "N"-qubit processor.

A method for quantum file remediation is provided. The method may include the step of receiving a file at a quantum file remediation program running on a computer system that includes a standard processor and an "N"-qubit processor. The file may have a set of attributes.

The method may include the step of determining, on the standard processor, when the file attribute score exceeds a predetermined distance from a first baseline score. The file attribute score may be based on the set of attributes and determined using AI/ML algorithms.

When the file attribute score exceeds a predetermined distance from the first baseline score, the method may include the steps of initializing a quantum circuit with the "N"-qubit processor and operating a QGAN framework on the quantum circuit to output a replacement file with a remediated security threat.

When the QGAN session ends, the method may include the step of collapsing the quantum circuit and replacing the file in storage with the replacement file.

In this method, "N" may be a number between two and one thousand, and the QGAN framework may utilize a superposition property of the "N"-qubit processor.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes computer 101. Computer 101 may alternatively be referred to herein as a "computing device" or "computing system". Computer 101 may be a quantum computer or part of a quantum computer. Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more "N"-qubit processors as well as standard microprocessors 103 for controlling the operation of the device and its associated components, and may include RAM 105, ROM 107, input/output module 109, and memory 115. Processors 103 may also execute all software running on computer 101, including operating system 117 and applications 119 such as a quantum file remediation program and security protocols. Other components commonly used for computers, such as EEPROM or Flash memory or any other suitable components, may also be part of the computer 101.

Memory 115 may be comprised of any suitable permanent storage technology such as a hard drive or other non-transitory memory. ROM 107 and RAM 105 may be included as all or part of memory 115. Memory 115 may store software including operating system 117 and application(s) 119 (such as a quantum file remediation program and security protocols) along with any other data 111 (e.g., historical data, configuration files) needed for the operation of apparatus 100. Memory 115 may also store applications and data. Alternatively, some or all of computer executable instructions (alternatively referred to as "code") may be embodied in hardware or firmware (not shown). Microprocessor 103 may execute the instructions embodied by the software and code to perform various functions.

Memory 115 may include any suitable permanent storage technology such as a hard drive or other non-transitory memory. The memory may store software including an operating system and any application(s) (such as a quantum file remediation program and security protocols) along with any data needed for the operation of the apparatus. The data may also be stored in cache memory, or any other suitable memory.

Input/output ("I/O") module 109 may include connectivity to a button and a display. Input/output module 109 may also include one or more speakers for providing audio output and a video display device, such as an LED screen and/or touchscreen, for providing textual, audio, audiovisual, and/or graphical output.

In an embodiment of the computer 101, processor or processors 103 may execute the instructions in all or some of the operating system 117, any applications 119 in memory 115, any other code necessary to perform the functions in this disclosure, and any other code embodied in hardware or firmware (not shown).

In an embodiment, apparatus 100 may consist of multiple computers 101, along with other devices. Computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". These remote computers and servers, terminals 141 and 151 (as well as other terminals, not shown) may be other quantum computers. References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be other quantum computers or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 may be connected to LAN 125 through a LAN interface or adapter 113. When used in a WAN networking environment, computer 101 may include a modem 127 or other means for establishing communications over WAN 129, such as Internet 131. Modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. Computer 101 may transmit data to any other suitable computer system. Computer 101 may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a quantum file remediation program and security protocols, as well as other programs. In an embodiment, one or more programs, or aspects of a program, may use one or more quantum file remediation and AI/ML algorithm(s). The various tasks may be related to detecting and/or remediating a security threat with a quantum computer. It should be noted that such programs may be considered, for the purposes of this application, as engines with respect to the performance of the particular tasks to which the programs are assigned.

Computer 101 may also include various other components, such as a battery (not shown), speaker (not shown), a network interface controller (not shown), and/or antennas (not shown).

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, multiprocessor systems, microprocessor-based systems, set top boxes, programmable consumer electronics, network PCs, minicomputers, mainframe computers, distributed computing environments that include any of the above systems or devices, quantum computers and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
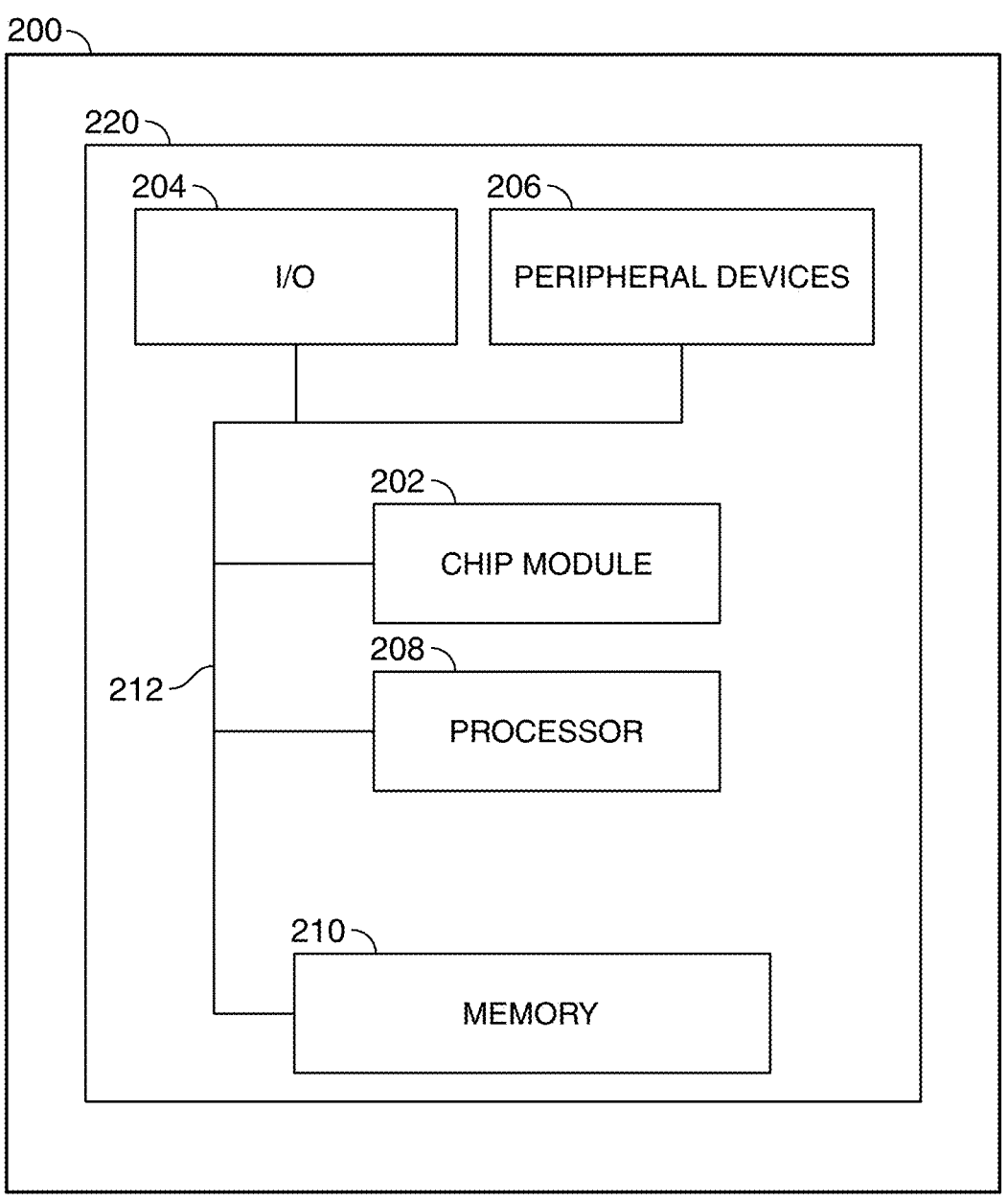
FIG. 2 shows an illustrative apparatus in accordance with principles of the disclosure.

FIG. 2 shows illustrative apparatus 200 that may be configured in accordance with the principles of the disclosure. Apparatus 200 may be a quantum computer, a server, or computer with various peripheral devices 206. Apparatus 200 may include one or more features of the apparatus shown in FIGS. 1-6. Apparatus 200 may include chip module 202, which may include one or more quantum and integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may be quantum-based and may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based. The chip may be quantum-based.

Figure 3:
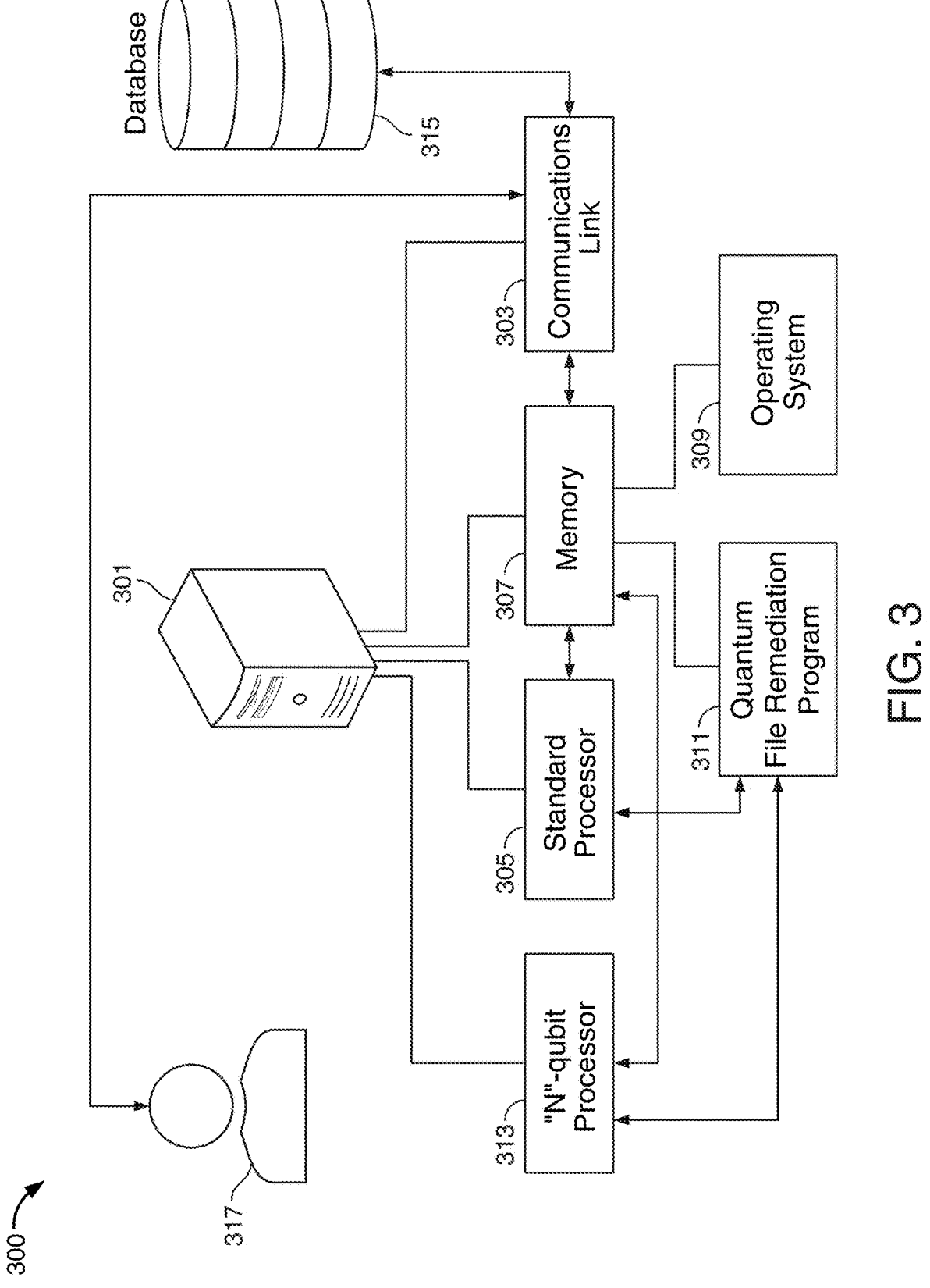
FIG. 3 shows an illustrative apparatus in accordance with principles of the disclosure.

FIG. 3 shows an illustrative apparatus schematic in accordance with principles of the disclosure. The apparatus may include computer system 301 and database 315. Network files stored in database 315 may be retrieved by computer system 301.

Computer system 301 may include communications link 303, standard processor/processors 305, non-transitory memory 307, "N"-qubit quantum processor 313, as well as other components, such as a graphical user interface.

Non-transitory memory 307, may include operating system 309 and a copy of quantum file remediation application 311, as well as other data and programs.

Communications link 303 may communicate with other computer systems and databases, such as database 315, as well as user 317. User 317 may be remote from computer system 301 and may be communicating through a separate computer system (not shown).

Quantum file remediation application 311 may run on both standard processor 305 and quantum processor 313.

Quantum file remediation application 311 may retrieve files from database 315. In some embodiments, files may be communicated from other systems or storage locations, within or outside the network, via communications link 303.

Quantum file remediation application 311 may determine, on processor 305, when a file attribute score deviates by more than predetermined amount from a baseline score stored in database 315.

When the file attribute score deviates from the baseline score, quantum file remediation application 311 may initialize a quantum circuit with the "N"-qubit processor 313.

Quantum file remediation application 311 may operate a QGAN framework on the quantum circuit to synthesize a replacement file with that remediates detected security threats and refine the file through iterative adversarial learning cycles. When the QGAN reaches a point of equilibrium, quantum authentication application 311 may collapse the quantum circuit. Computer system 301 may replace the file stored in database 315 with the replacement file.

Figure 4:
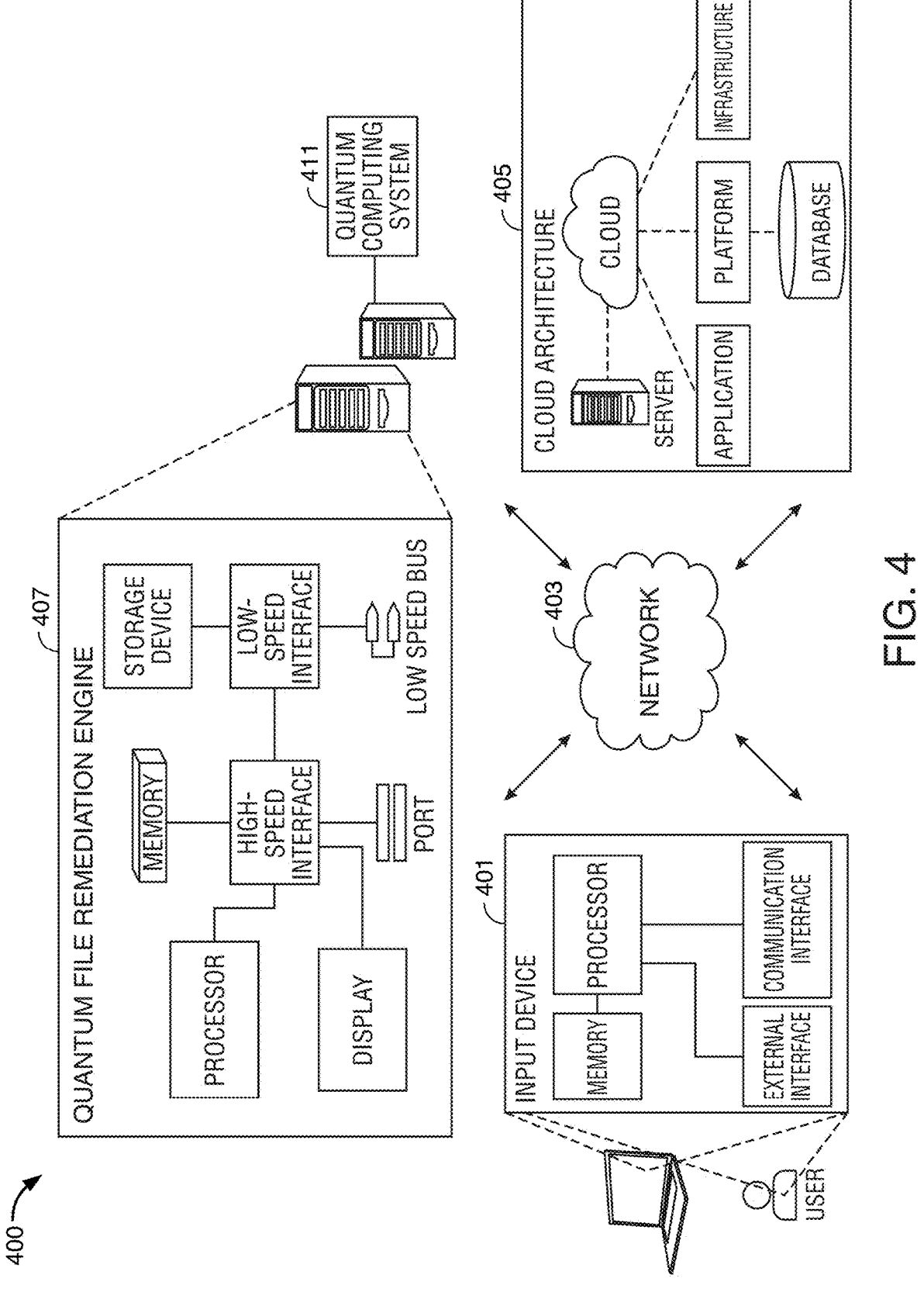
FIG. 4 shows an illustrative diagram in accordance with principles of the disclosure.

FIG. 4 shows illustrative diagram 400 in accordance with principles of the disclosure. Diagram 400 includes input device 401, cloud architecture 405, and quantum file remediation engine 407, some or all of which may be in communication with each other via architecture network 403.

Input device 401 may include a memory, processor, external interface, and communication interface. Cloud architecture 405 may include various servers, applications, platforms, infrastructures, and databases. Cloud architecture 405 may include quantum computing system 411.

Quantum file remediation engine 407 may run on quantum computing system 411 which may include both an N-qubit quantum processor and a standard micro-processor, a display, memory, high- and low-speed interfaces, connection ports, and suitable memory devices and communication busses. Engine 407 may detect security threats in a file and perform various computing tasks according to the methods and configurations disclosed herein.

Figure 5A:
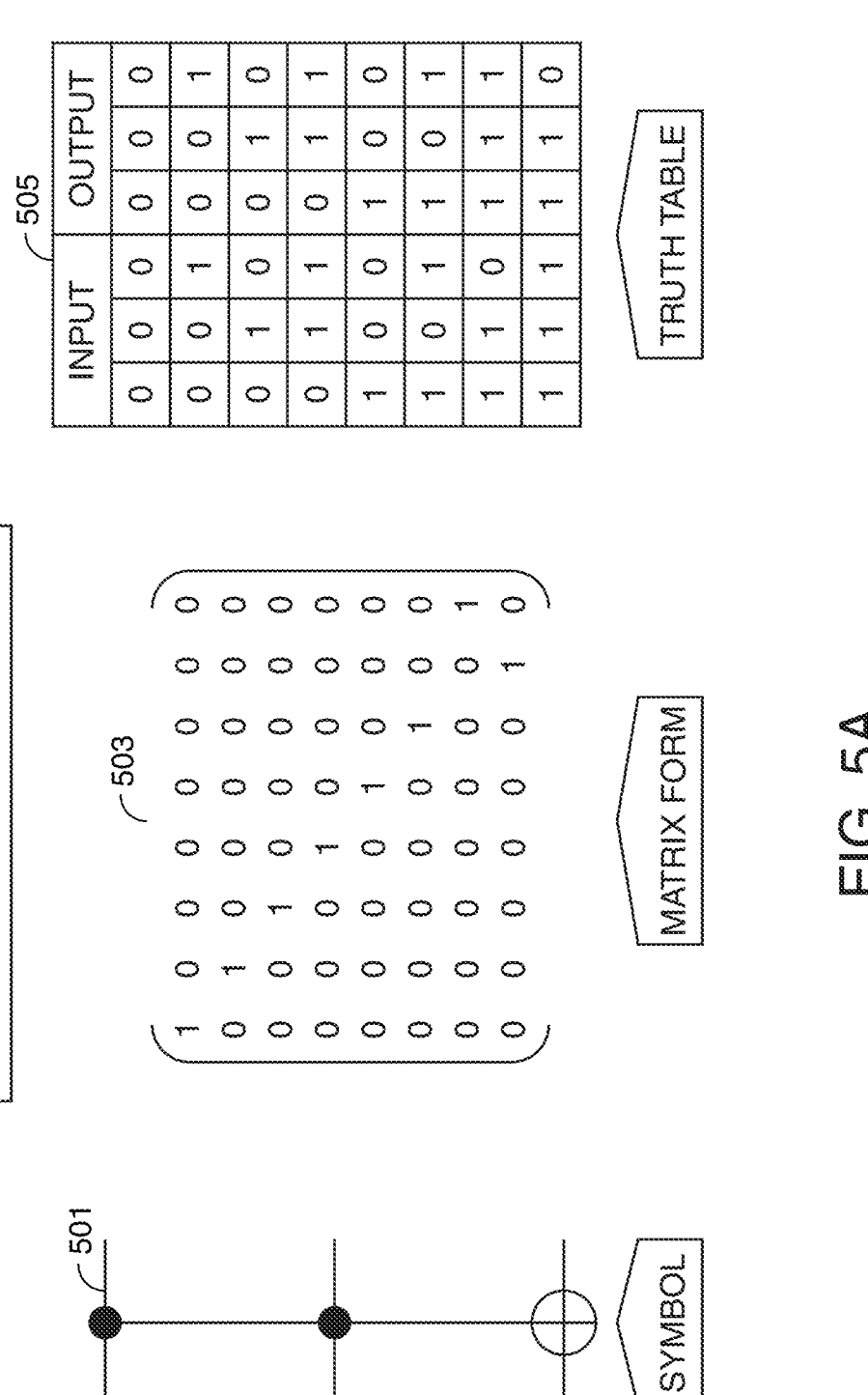
FIG. 5A shows an illustrative logic gate in accordance with principles of the disclosure.
Figure 5B:
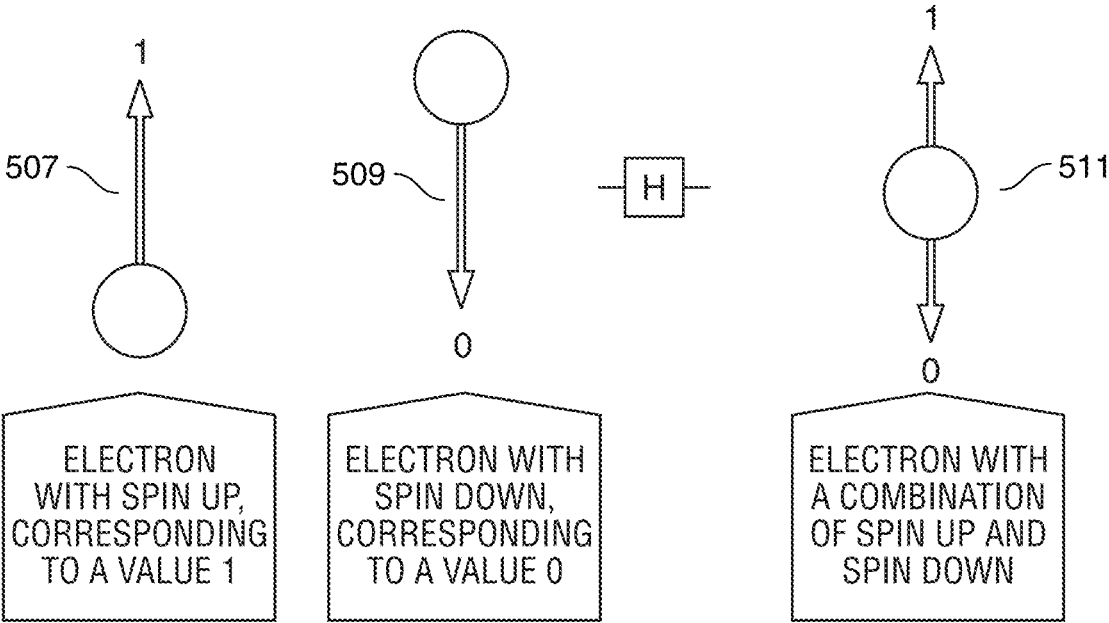
FIG. 5B shows an illustrative logic gate in accordance with principles of the disclosure.

FIGS. 5A-5B show illustrative diagrams of exemplary quantum gates in accordance with principles of the disclosure. FIG. 5A shows symbol 501, matrix form 503, and truth table 505 of a Toffoli gate. A Toffoli gate is a universal reversible logic gate, which means that it enables simulation of any classical reversible circuit. In operation, as seen in truth table 505, the exemplary Toffoli gate has a 3-bit input and a 3-bit output. The first two output bits always mirror the first two input bits. The third bit also stays the same unless the first two input bits are both set to 1-in which case the third output bit is inverted from the third input bit. The Toffoli gate is therefore also known as the "controlled-controlled-not" gate.

FIG. 5B shows representations of a Hadamard gate. Symbol 507 shows a representation of electron spin up, which corresponds to the value 1. Symbol 509 shows a representation of electron spin down, which corresponds to the value 0. Symbol 511 shows a representation of electron spin up and down, which corresponds to the value that represents a superposition of 1 and 0.

Figure 6:
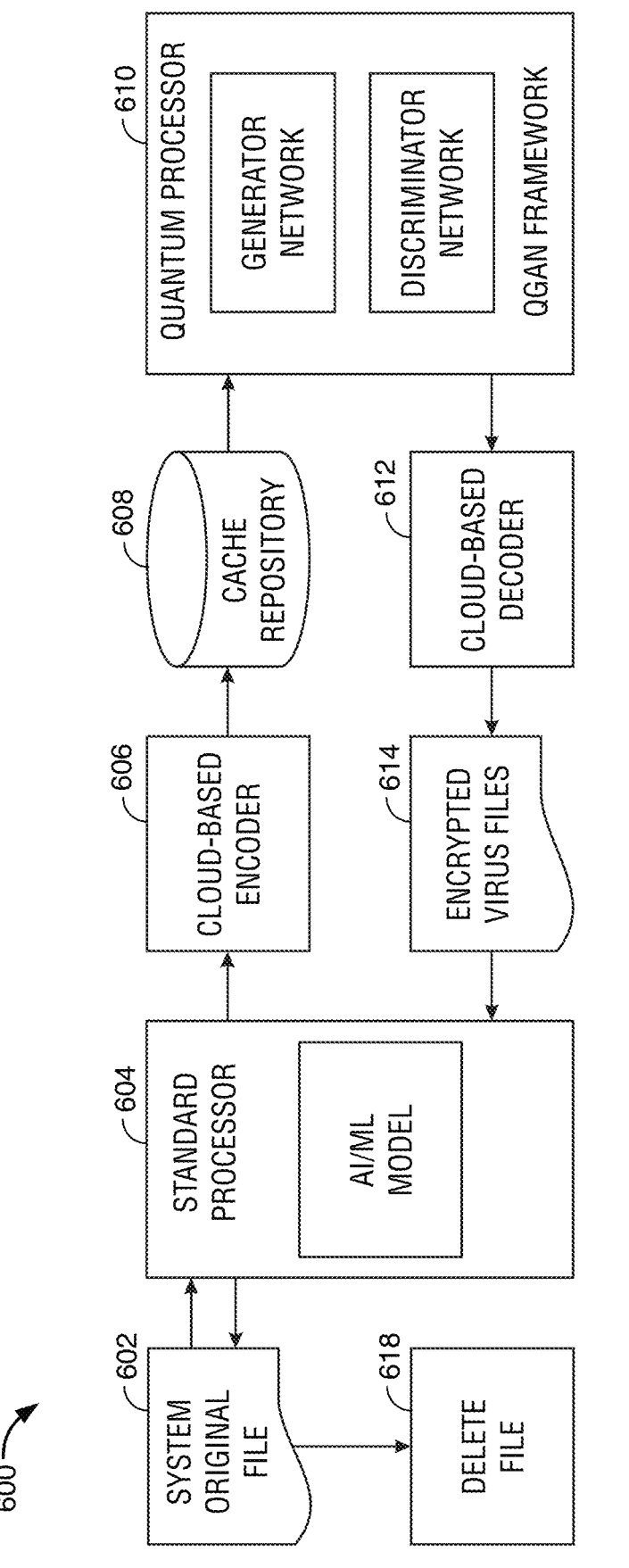
FIG. 6 shows an illustrative diagram in accordance with principles of the disclosure.

FIG. 6 shows illustrative diagram 600, in accordance with the principles of the disclosure. At 602, a system file may be received. At 604, a standard processor may screen the file using an AI/ML model to determine file attributes, output a file attribute score, select and/or determine a baseline score, and determine whether the file attribute score deviates by more than a predetermined amount from the baseline score.

At 606, the file may be encrypted by a cloud-based encoder for transmission to a quantum processor. At 608, a copy of the encrypted file may be stored in a cache repository. The encrypted file may be compared to other stored files. At 610, a QGAN framework may synthesize a replacement file using generator and discriminator neural networks.

At 612, a replacement file output by the QGAN framework may be decrypted by a cloud-based decoder. At 614, malware identified by the QGAN framework may be encrypted and transmitted to the AI/ML model for training. At 618, the original file may be deleted and the replacement file output by the QGAN may be stored in its place.

Figure 7:
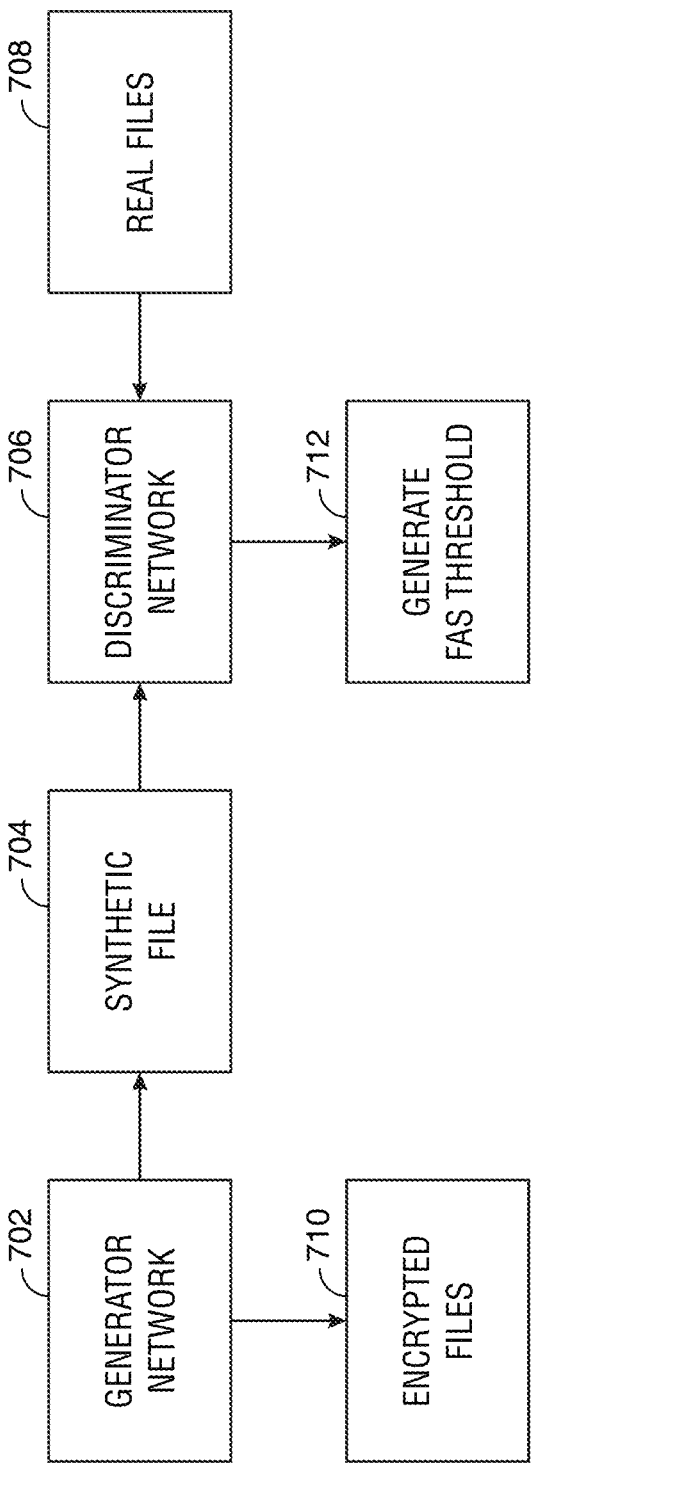
FIG. 7 shows an illustrative diagram in accordance with the principles of the disclosure.

FIG. 7 shows illustrative diagram 700, in accordance with the principles of the disclosure. Illustrative diagram 700 shows operation of the QGAN framework.

The QGAN framework may detect a security threat in a file. At 702, a generator neural network may synthesize replacement file 704 that may remediate the security threat. For example, the replacement file may include an updated version of a programming log. At 706 a discriminator neural network may use data from real files 708 to determine the authenticity and security of the replacement file. The discriminator network may generate an adaptive file attribute score threshold based on real files and updated security data. The adaptive file attribute score may be customized based on the class and content of the file.

The generator network may iterate through successive versions of the replacement file based on feedback from the discriminator network. At 710, an updated version of the replacement file may be accepted by the discriminator network and the generator network may output a final version of the replacement file that is encrypted for transmission.

Figure 8:
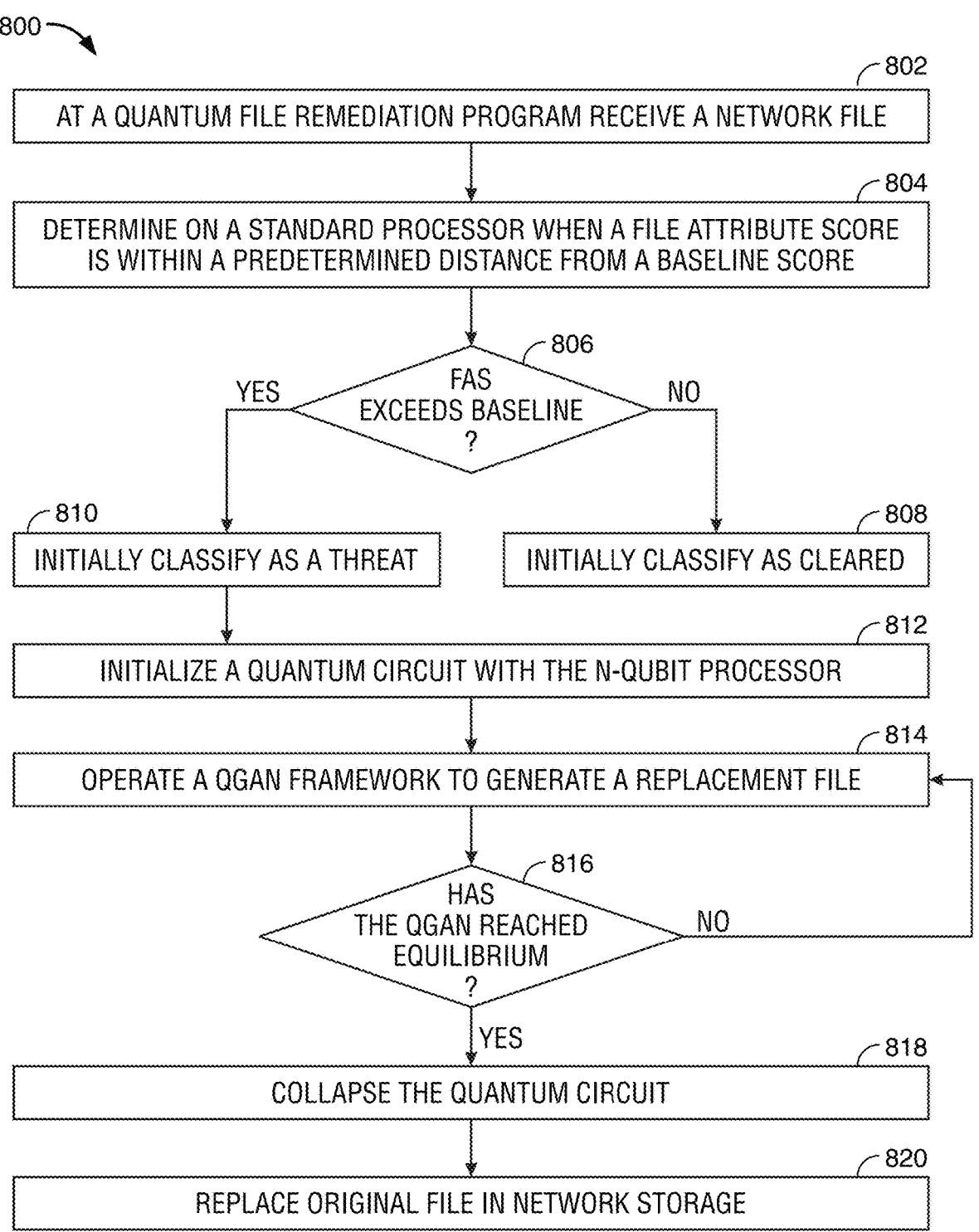
FIG. 8 shows an illustrative flow chart in accordance with the principles of the disclosure.

FIG. 8 shows illustrative flowchart 800, in accordance with principles of the disclosure. Methods may include some or all of the method steps numbered 802 through 820. Methods may include the steps illustrated in flowchart 800 in an order different from the illustrated order. The illustrative method shown in flowchart 800 may include one or more steps performed in other figures or described herein. Steps 802 through 820 may be performed on the apparatus shown in FIGS. 1-5, or other apparatus.

At step 802, a quantum file remediation application or computer program on a computer system that includes both a micro-processor (or standard processor) and an "N"-qubit processor, may receive a file.

At step 804, the application may determine, on the standard processor, when a file attribute score is within a predetermined distance from a baseline score. Determination of the file attribute score and/or the distance from the baseline score may be made by an AI/ML algorithm or algorithms.

After the determination is made at steps 804 and 806, the program may continue. At step 808, when the file attribute score is within a predetermined distance of the baseline score, the file may be initially classified as cleared. At step 810, when the file attribute deviates by more than a predetermined distance from the baseline score, the file may be initially classified as a potential security threat.

At step 812, the program may initiate one or more quantum circuits with the "N"-qubit processor. Each quantum circuit may include one or more quantum gates and one or more of the qubits.

At step 814, the program may operate a QGAN framework. A generator network may generate a replacement file that eliminates potential threats. A discriminator network may use real world data to dynamically generate a threshold file attribute score and determine a variance associated with the replacement file. At step 816, the file may iterate between the generator and discriminator networks until equilibrium is reached.

At step 818, when the QGAN reaches equilibrium, the program may collapse the quantum circuit or circuits initialized at step 812. At step 820, the program may delete the original file and store the replacement file in network storage.

Thus, apparatus and methods for a QUANTUM-BASED ADAPTIVE DEEP LEARNING FRAMEWORK FOR SECURING NETWORK FILES are provided. Persons skilled in the art will appreciate that the present invention can be practiced by other than the described embodiments, which are presented for purposes of illustration rather than of limitation.

What is claimed is:

1. A quantum file remediation computer program product, the computer program product comprising a non-transitory computer-readable medium storing instructions that, when executed by a computer system that comprises a standard processor and an n-qubit processor, cause the computer system to:

receive an original file, the file comprising a set of attributes;

determine, on the standard processor, when a file attribute score deviates by more than a predetermined amount from a first baseline score, the file attribute score based at least in part on the set of attributes; and when the file attribute score deviates by more than pre-determined amount from the first baseline score:

initialize a quantum circuit with the n-qubit processor; and operate a quantum generative adversarial network (QGAN) on the quantum circuit, the QGAN comprising a generator neural network and a discriminator neural network;

detect a security threat associated with the file;

at the generator neural network, synthesize a version of a replacement file comprising a remediation associated with the security threat;

at the discriminator neural network, determine when the version of the replacement file is associated with a file attribute score that deviates by more than a predetermined amount from a second baseline score, the second baseline score dynamically determined based at least in part on a set of reference files;

at the generator neural network, in response to output from the discriminator neural network, synthesize a new version of the replacement file, based at least in part on output from the discriminator neural network; and when the QGAN reaches equilibrium:

collapse the quantum circuit; and replace the original file with a version of the replacement file;

wherein:

n is a number between two and one thousand; and the QGAN utilizes a superposition property of the n-qubit processor.

2. The quantum file remediation computer program product of claim 1, wherein the set of attributes comprises an author, size, date of creation, version, and entropy level associated with the file.

3. The quantum file remediation computer program product of claim 1, wherein an alert associated with the security threat is transmitted to a user and displayed on a graphical user interface.

4. The quantum file remediation computer program product of claim 1, wherein the instructions use one or more artificial intelligence/machine learning ("AI/ML") algorithms to determine when the file attribute score exceeds the first baseline score at the standard processor.

5. The quantum file remediation computer program product of claim 4, wherein malware detected by the QGAN is encrypted and transmitted to the standard processor for training the AI/ML algorithms.

6. The quantum file remediation computer program product of claim 1, wherein a cloud-based encoder encrypts the original network file for transmission to the QGAN.

7. The quantum file remediation computer program product of claim 1, wherein the second baseline score is generated through one or more entanglement algorithms.

8. The quantum file remediation computer program product of claim 1, wherein the second baseline score is generated through one or more superposition algorithms.

9. The quantum file remediation computer program product of claim 1, wherein the quantum circuit comprises one or more Toffoli gates.

10. An apparatus for quantum authentication using quantum computing, the apparatus comprising:

a computer system comprising:

a communication link;

a microprocessor;

an "N"-qubit processor; and a non-transitory memory configured to store at least:

an operating system; and a quantum file remediation application;

wherein the quantum file remediation application:

receives a network file, the file comprising a set of attributes;

determines, on the microprocessor, when a file attribute score exceeds a predetermined distance from a first baseline score, the file attribute score based at least in part on the set of attributes;

detects a security threat associated with the network file based on the file attribute score; and when the file attribute score exceeds a predetermined distance from the first baseline score:

initializes a quantum circuit with the n-qubit processor; and operates a quantum generative adversarial network (QGAN) session on the quantum circuit, the QGAN comprising a generative network and a discriminator network;

using the generator network, synthesizes a replacement file configured to remediate the detected security threat;

using the discriminator network, determines when the replacement file is associated with a quantum file attribute score that exceeds a predetermined distance from a second baseline score, the second baseline score dynamically determined based at least in part on a set of training files; and when the QGAN session ends:

collapses the quantum circuit; and replaces the network file with the replacement file; and wherein:

n is a number between two and one thousand; and the QGAN utilizes a superposition property of the n-qubit processor.

11. A method for quantum-based file remediation, the method comprising:

receiving, at a quantum file remediation computer program running on a computer system comprising a standard processor and an "N"-qubit processor, a first file comprising a set of attributes;

determining, on the standard processor, when a file attribute score deviates by more than a predetermined amount from a first baseline score, the file attribute score based at least in part on the set of attributes;

detecting a security threat associated with the first file based on the file attribute score; and when the file attribute score deviates by more than a predetermined amount from the first baseline score:

initializing a quantum circuit with the n-qubit processor;

operating a quantum generative adversarial network (QGAN) session on the quantum circuit, the QGAN comprising a generative network and a discriminator network;

at the generator network, synthesizing a second file, the second file comprising a version of the first file, the second file remediating the security threat;

at the discriminator network, determining when the second file is associated with a quantum file attribute score that deviates by more than a predetermined amount from a second baseline score, the second baseline score dynamically determined based at least in part on a set of training files; and when the QGAN session ends:

collapsing the quantum circuit; and replacing the first file with the second file;

wherein:

n is a number between two and one thousand; and the QGAN utilizes a superposition property of the n-qubit processor.

12. The method of claim 11, wherein the set of training files is associated with the security threat, the method further comprising:

at the generator network, in response to an output from the discriminator network, synthesizing a third file, the third file comprising a version of the second file; and at the discriminator network, determining whether the third file is associated with a quantum file attribute score that deviates by more than a predetermined amount from a third baseline score, the third baseline score dynamically determined based at least in part on the set of training files.

13. The method of claim 12, the method further comprising iterating between an output from the generator network and an output from the discriminator network until an output from the generator network and an output from the discriminator network reach a point of equilibrium.

14. The method of claim 11, the set of attributes comprising an author, size, date of creation, version, and entropy level associated with the file.

15. The method of claim 11, wherein an alert associated with the first file is transmitted to a user and displayed on a graphical user interface.

16. The method of claim 11, wherein the instructions use one or more artificial intelligence/machine learning ("AI/ML") algorithms to determine when the file attribute score exceeds the first baseline score at the standard processor.

17. The method of claim 16, wherein malware detected by the QGAN is encrypted and transmitted to the standard processor for training the AI/ML algorithms.

18. The method of claim 11, further comprising, at a cloud-based encoder, encrypting the original network file for transmission to the QGAN.

19. The method of claim 11, wherein the second baseline score is generated through one or more entanglement algorithms.

20. The method of claim 11, wherein the second baseline score is generated through one or more superposition algorithms.

21. The method of claim 11, wherein the quantum circuit comprises one or more Toffoli gates.

\* \* \* \* \*